No. 634,003. Patented Oct. 3, 1899.
J. H. KELLOGG.
PROCESS OF PREPARING CEREAL CAKES.
(Application filed Oct. 12, 1898.)

(No Model.)

WITNESSES:

INVENTOR
John H. Kellogg
BY
ATTORNEYS.

UNITED STATES PATENT OFFICE.

JOHN H. KELLOGG, OF BATTLE CREEK, MICHIGAN, ASSIGNOR TO THE SANITAS NUT FOOD COMPANY, LIMITED, OF SAME PLACE.

PROCESS OF PREPARING CEREAL CAKES.

SPECIFICATION forming part of Letters Patent No. 634,003, dated October 3, 1899.

Application filed October 12, 1898. Serial No. 693,284. (No specimens.)

*To all whom it may concern:*

Be it known that I, JOHN HARVEY KELLOGG, of Battle Creek, in the county of Calhoun and State of Michigan, have invented certain new and useful Improvements in Processes of Preparing Cereal Cakes, of which the following is a full, clear, and exact description thereof.

My invention relates to an improved process of preparing cereal cake or biscuit manufactured from an improved alimentary product more particularly described in Letters Patent granted to me April 14, 1896, and numbered 558,393; and the present invention also relates to a new process for making such product in the form of a cake or biscuit.

The object of this invention is to produce a new article of food in convenient and compact form; and to this end the invention consists in the new process and the new article of manufacture hereinafter described and claimed.

In my former patent, before referred to, I have described an improved alimentary product and the process for producing the same, such product existing in the form of large, attenuated, baked, crisp, and slightly brown flakes of practical uniform thickness prepared from various grains. In the production and consumption of this product I have found that it is desirable and sometimes essential to prepare the product in the form of cakes or biscuits instead of loose flakes for the more economical and convenient handling of the product and for the better preservation of the nutritious and health-giving elements of such product.

In carrying out my invention I employ the means and methods hereinafter described, and shown in the accompanying drawings, the several figures of which will be specifically referred to.

Figure 1:
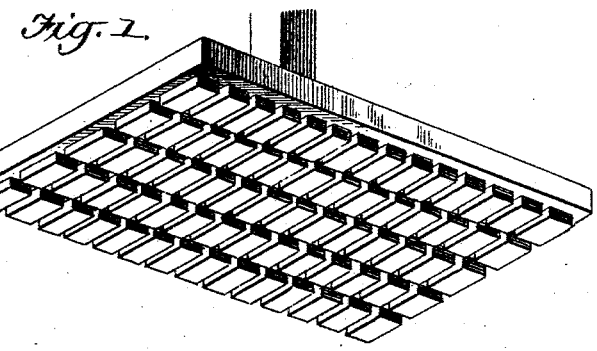
Figure 2:
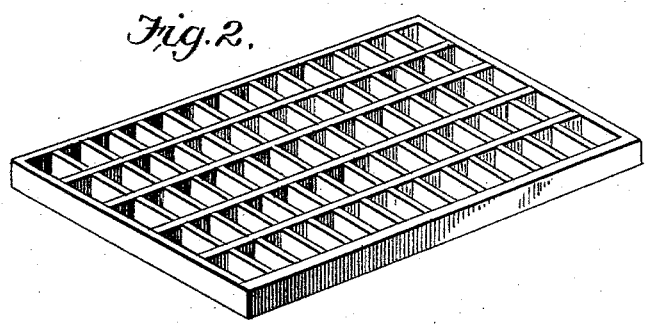
Figure 3:
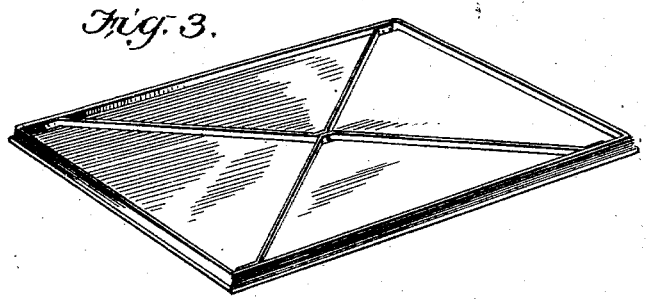
Figure 4:
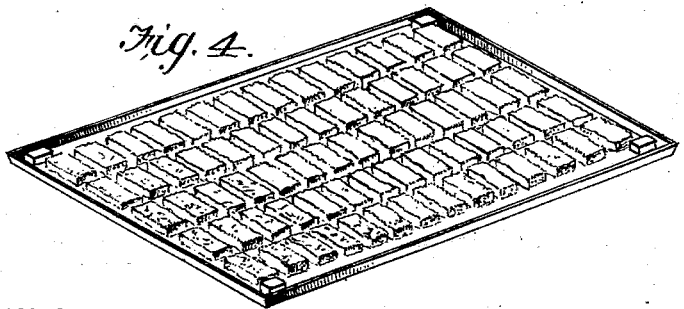

Figures 1 and 2 are perspectives of the two parts of the mold which are shown separated. Fig. 3 is a perspective of the iron cover or lid. Fig. 4 is a similar view of the pan upon which the cakes are arranged.

In my prior patent the last two steps consist in subjecting the previously-prepared cereal flakes to a steaming process, by which they are thoroughly cooked, the last step being the baking or roasting of the flakes in an oven until they are dry, crisp, and slightly brown. In my present invention the last two steps of this before-referred-to process are omitted, and the flakes are taken immediately after the rolling process and while still moist and subjected to the first step of this new process, which consists in placing the cereal flakes in a bottomless crate, (shown in Fig. 2,) which crate rests upon a large shallow pan, Fig. 4, such pan serving temporarily as a bottom for the crate. Each compartment of this bottomless crate is filled with the moist cereal flakes, and the excess is scraped off the top of the crate.

The next step of the process consists in placing the crate containing the moist flakes in a press and subjecting the flakes in each compartment of the crate to pressure from a presser or plunger, Fig. 1, such presser consisting of blocks adapted to fit the several compartments of the crate, so that any desired degree of compression can be applied to the moist flakes. After the flakes have been pressed sufficiently the crate is removed from the press, and by slightly jarring the frame of the crate it is lifted free from the pan, leaving the perfectly-formed cakes arranged in regular rows in the shallow pan.

Before proceeding with the third step of the process, which consists in setting the cakes, four small blocks of wood are set in the pan, one in each corner. These blocks of wood are of about the same vertical thickness as are the cakes, and they are adapted to support, without injury to the cakes, a heavy iron cover or lid, Fig. 3. For the third step of the process the pan is placed in an oven, with the cover in place, and permitted to remain from five to ten minutes, according to the degree of heat required to set the cakes.

The fourth step of the process consists in removing the cover and baking the cakes in the oven until they are properly cooked, the finishing process consisting of passing the cakes while still in the pan underneath a gas-toaster, the operation being about the same as that of broiling meat, with the exception that the cakes do not remain for any length of time under the flame, being kept constantly in motion. The latter two steps of the process serve to produce a well-cooked and slightly-browned nutritious cake or biscuit and in a large measure serves to convert the starch into dextrine.

The result of the process is a product consisting of separate flakes loosely held together in the form of a cake and baked or dried in this shape. If one of these cakes is placed in a glass of water, it quickly separates into the original flakes.

It might be possible to avoid the use of a heavy iron cover in setting the cakes by applying more pressure to the flakes while in the press, and it might also be desirable to prepare the flakes in one large cake and divide into biscuits at any of the latter stages of the process.

Of course it is understood that the presser or plunger blocks are secured to a piston and operated by a lever and that the press can be so arranged as to receive as many crates at one time as the manufacturer may desire.

Having thus described my invention, I claim as new and desire to secure by Letters Patent—

The process hereinbefore described for the manufacture of an improved alimentary cereal product in the form of a cake or biscuit which consists, first in placing the moist and previously cooked or steamed cereal flakes in the several compartments of a bottomless crate, said crate temporarily resting upon a shallow pan; second, subjecting the moist flakes while in the crate to pressure; third, removing the crate and leaving the formed cakes in the shallow pan and placing said pan in an oven for a sufficient length of time to permit the cakes to set; fourth, baking the cakes until thoroughly dry and crisp and fifth, passing the cakes underneath a gas-toaster and browning the flakes, the last two steps serving to convert the starch into dextrine, as specified.

JOHN H. KELLOGG.

Witnesses:
WILL. K. KELLOGG,
L. E. LAWSON.